United States Patent [19]

Hiranuma et al.

[11] Patent Number: 5,582,204

[45] Date of Patent: Dec. 10, 1996

[54] PLUG FOR QUICK DISCONNECT COUPLING

[75] Inventors: Toshio Hiranuma; Shigeru Yasuda; Hiroshi Nakamura, all of Tokyo, Japan

[73] Assignee: Max Co., Ltd., Japan

[21] Appl. No.: 233,787

[22] Filed: Apr. 26, 1994

[30] Foreign Application Priority Data

Apr. 27, 1993 [JP] Japan ................. 5-022342 U

[51] Int. Cl.⁶ .................. F16L 37/28; F16K 15/00
[52] U.S. Cl. .................. 137/539; 137/515.5; 251/149.6
[58] Field of Search .................. 251/149.1, 149.6, 251/149.7, 148, 149; 137/539, 515, 515.3, 515.5, 515.7; 285/316, 317, 315

[56] References Cited

U.S. PATENT DOCUMENTS

| | | | |
|---|---|---|---|
| 1,092,673 | 4/1914 | Stephens | 251/149.1 |
| 1,924,374 | 8/1933 | Peteler | 137/539 X |
| 3,230,964 | 1/1966 | Debrotnic et al. | 251/149.6 X |
| 3,448,760 | 6/1969 | Cranage | 251/149.6 X |
| 3,538,950 | 11/1970 | Porteners | 251/149.6 X |
| 3,650,507 | 3/1972 | Nyberg | 251/149.6 |
| 4,114,853 | 9/1978 | Medvick | 251/149.6 |

FOREIGN PATENT DOCUMENTS

| | | | |
|---|---|---|---|
| 22814 | 10/1912 | United Kingdom | 251/149.6 |
| 220162 | 8/1924 | United Kingdom | 251/149.6 |

*Primary Examiner*—Kevin Lee
*Attorney, Agent, or Firm*—Cushman Darby & Cushman, IP Group of Pillsbury Madison & Sutro, LLP

[57] ABSTRACT

A plug for a quick disconnect coupling for connecting an hose and being received in a socket, the plug has a hose fitting portion and a socket fitting portion. The hose fitting portion is fitted with the hose. And the socket fitting portion being received in the socket includes holes for letting its internal space communicate with the outside arranged radially in the socket fitting portion. Furthermore, the socket fitting portion may includes a self-seal valve for sealing a head opening of the socket fitting portion.

7 Claims, 2 Drawing Sheets

PLUG FOR QUICK DISCONNECT COUPLING

BACKGROUND OF THE INVENTION

The present invention relates to a quick disconnect coupling and more particularly to a plug for a quick disconnect coupling for coupling a high-pressure air hose.

Conventionally, air compressors via quick disconnect couplings connect to hoses of pneumatic tools by providing a socket for such a quick disconnect coupling on the air compressor side and providing the hose with a plug adapted for the quick disconnect coupling, so that the hose is made detachable from the air compressor in a one-touch mode. When the plug is put in the socket, the leading end of the plug opens the self-seal valve of the socket, whereby the plug and the socket are simultaneously coupled together. The hose is removable from the socket by sliding the lock ring of the socket to let the plug come off the socket. The self-seal valve of the socket is then closed.

When the hose connected to the air compressor is removed, however, the hose may throb like a whip and injure persons or damage commodities nearby due to the reaction force of pressurized air gushing out of the plug of the hose connected to the terminal unit of the pneumatic tool.

If the pressurized air in the hose is hermetically sealed up by providing the plug with the self-seal valve to prevent the air from gushing out of the plug, the terminal unit may be driven with the pressurized air sealed in the hose in such a state that the hose has been detached from the air compressor. However, while a box nailing machine, for example, is being operated, it is still liable to cause an accident.

SUMMARY OF THE INVENTION

Accordingly, there exist technical problems of preventing the pulsating motion of a hose by lessening its propulsive energy when the hose is removed in order to obviate the danger of inflicting injury on workers. It is therefore an object of the present invention to solve the foregoing problem.

In order to solve the foregoing problems, the present invention is provided a plug for a quick disconnect coupling for connecting an hose and being received in a socket, the plug has a hose fitting portion and a socket fitting portion. The hose fitting portion is fitted with the hose. And the socket fitting portion being received in the socket includes holes for letting its internal space communicate with the outside arranged radially in the socket fitting portion.

The holes for communicating the internal space of the plug with the outside are radially arranged in the portion where the plug is put in the socket. When the plug is removed from the socket, the pressurized air that has filled up the hose on the plug side gushes out through the holes. As the air is allowed to gush out radially, the reaction force is offset thereby and the hose is thus prevented from pulsating as its propulsive energy is lessened when the air gushes out.

DESCRIPTION OF THE PREFERRED EMBODIMENTS

Figure 1:
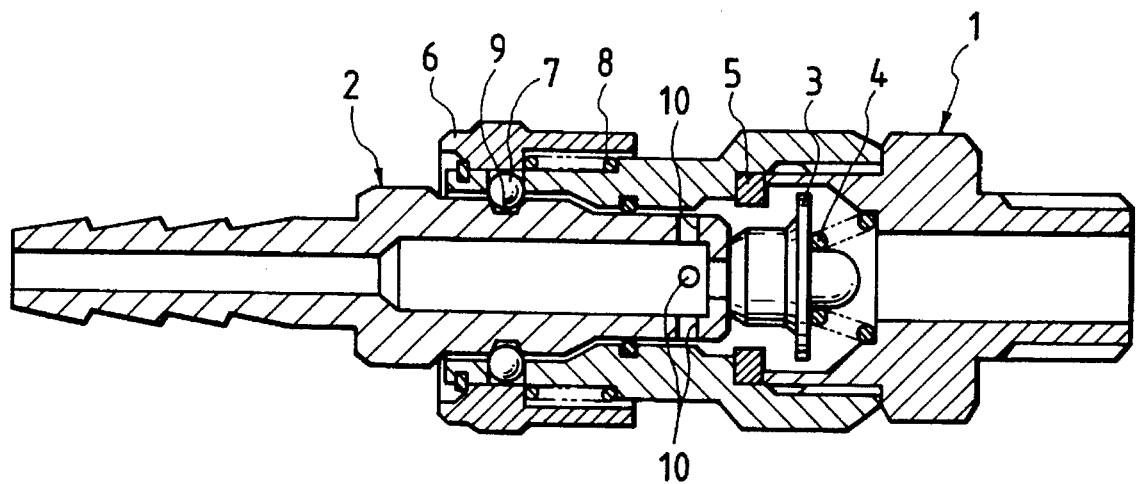
FIG. 1 is a sectional view of a plug which has been put in a socket according to the present invention.

Referring to the accompanying drawings, a detailed description of the invention will be described. FIG. 1 is a sectional view of a plug 2 according to the present invention in such a state that it has been put in a socket 1 of a quick disconnect coupling. The socket 1 connected to the pressurized-air supply side contains a self-seal valve 3, which has been urged by a spring 4 toward to the opening side. When the plug 2 is removed, the self-seal valve 3 is forced to contact a sheet 5 and the air is stopped from flowing out. The socket 1 and the plug 2 are coupled together when balls 7 of a joint mechanism including a rock ring 6, balls 7 and a spring 8 are fitted in a groove 9 formed in the outer peripheral face of the plug 2. The plug 2 can be detached by sliding back the rock ring 6 urged by the spring 8 in the direction of the leading end so as to release the pressure applied to the balls.

The plug 2 is provided with radially-arranged holes 10 intersecting the axial line of the plug 2 at right angles in the neighborhood of the leading end of a fitting portion which is to fit with the socket 1. While the plug 2 remains in the socket 1 as shown in FIG. 1, the leading end of the plug 2 is pressed against the self-seal valve 3 of the socket 1 to open a flow passage and the open ends of the holes 10 are covered with the inner peripheral face of the socket 1. Consequently, the pressurized air is supplied from the socket 1 on the air supply side to a hose (not shown) fitted with the plug 2.

Figure 2:
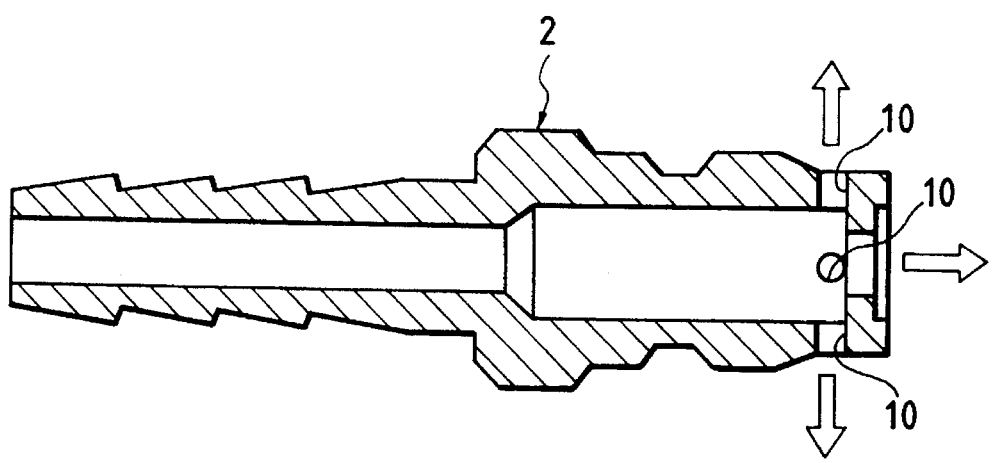
FIG. 2 is a sectional view of the plug according to the present invention.

When the plug 2 is removed from the socket 1 after the operation of a pneumatic tool connected to the other end of the hose is terminated, the pressurized air that has filled up the hose gushes from the holes 10 of the plug 2 as well as the head opening thereof as shown in FIG. 2. As the air is also allowed to gush out through the radial holes 10, thus decreasing the amount of air to be released from the head opening of the plug, the reaction force of the air decreases, so that the hose is set free from pulsating as the propulsive energy of the gushing air is minimized.

Figure 3:
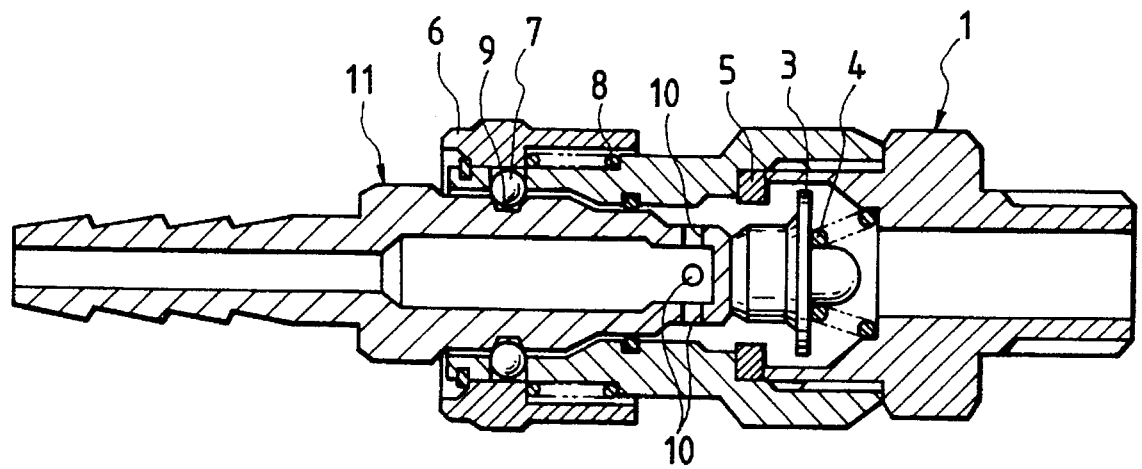
FIG. 3 is a sectional view of another plug which has been in a socket of the invention.

FIG. 3 refers to another embodiment of the present invention, wherein the diameter of the leading end portion of a plug 11 is reduced and its head opening is completely closed. Holes 10 are radially arranged at the diameter reducing portion of the plug 11 for the distribution of pressurized air therethrough. When the plug 11 is removed, the air in the hose is discharged through the holes 10, so that the propulsive energy of the plug 11 and the hose in the axial direction is reduced to zero.

Figure 4:
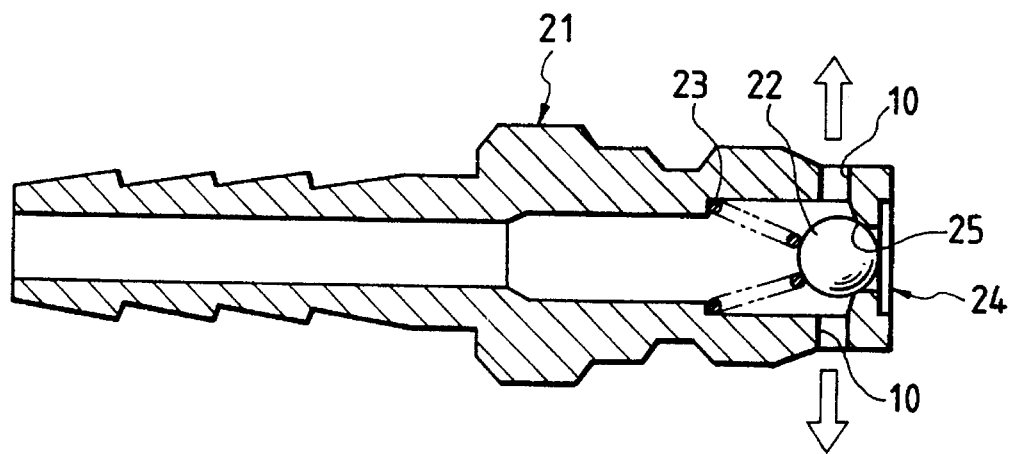
FIG. 4 is a sectional view of another plug of the invention.

Another plug 21 as shown in FIG. 4 has holes 10 so arranged radially as to intersect the axis of the plug at right angles, and a self-seal valve 24 with a ball 22 and a spring 23, the ball being forced to contact a sheet 25 formed by reducing the head opening. When the plug is put in the socket 1, the ball 22 is moved back by the pressurized air from the socket 1 and the air is supplied to the hose via the socket 1 and the plug 21.

When the plug 21 is removed from the socket 1, further, the spring 23 and the air pressure in the hose force the ball 22 to contact the sheet 25, whereby the head opening is sealed. Then the holes 10 are opened to let the pressurized air gush out therethrough.

The present invention is not limited to the embodiments stated above but may be modified in various ways with respect to the number of holes 10 the arrangement of the self-seal valve 24 and the like without departing the spirit and scope of the invention.

As set forth above in detail, the holes for communicating the internal space of the plug with the outside are radially arranged in the portion where the plug is put in the socket so as to discharge the pressurized air in the hose therefrom when the hose is removed. Consequently, the hose is prevented from pulsating as substantially no reaction force is generated in the plug and the hose. Therefore, the possibility of injuring persons or damaging commodities nearby due to the pulsating action of the hose is obviated with the effect of practically improving the safety of operation.

What is claimed is:

1. A plug for quick connection and disconnection between a hose and a socket, comprising:

a hose fitting portion configured to be fitted with the hose;

a socket fitting portion configured to be slidably receivable in the socket, said socket fitting portion having an axial opening and means for communicating an interior of said socket fitting portion with an exterior, said means being arranged at a periphery of said socket fitting portion adjacent to said axial opening, said socket fitting portion comprising a self-seal valve, said self-seal valve being biased to seal said axial opening while leaving said means for communicating substantially unobstructed.

2. A plug according to claim 1, wherein said self-seal valve comprises:

a ball configured to seal said axial opening; and a spring urging said ball toward said axial opening.

3. A hollow plug for coupling a hose to a socket in which the plug is engagingly received by the socket, the plug having a central axis and comprising:

a first portion configured to engage the hose; and a second portion opposite said first portion configured to engage the socket, said second portion having a partially closed end and a plurality of peripheral openings adjacent to said partially closed end, said partially closed end and said plurality of peripheral openings being in communication with an interior of said second portion, wherein said partially closed end is sufficiently closed relative to a total area of said plurality of peripheral openings, such that a fluid, passing between the interior of said second portion and an exterior thereof by way of said partially closed end and said plurality of peripheral openings, passes primarily via said plurality of peripheral openings compared to said partially closed end.

4. A hollow plug according to claim 3, wherein an axis of each said peripheral opening intersects the central axis at a right angle, and wherein said peripheral openings are uniformly angularly spaced about the central axis.

5. A coupling assembly comprising:

a plug, said plug having a central axis and comprising:

a first portion configured to engage a hose; and a second portion opposite said first portion configured to engage a socket, said second portion having a partially closed end and a plurality of peripheral openings adjacent to said partially closed end, said partially closed end and said plurality of peripheral openings being in communication with an interior of said second portion, wherein said partially closed end is sufficiently closed relative to a total area of said plurality of peripheral openings, such that a fluid, passing between the interior of said second portion and an exterior thereof by way of said partially closed end and said plurality of peripheral openings, passes primarily via said plurality of peripheral openings compared to said partially closed end; and a socket, said socket having a first end and a second end communicating with said first end, said socket being configured to engagingly receive said plug at said first end, wherein said socket includes a self-sealing valve which is biased so as to block communication between said first and second ends of said socket, wherein said plug is constructed and arranged relative to said socket to displace said self-sealing valve when said socket is engageably received within said socket, thereby restoring communication between said first and second ends of said socket.

6. A coupling assembly according to claim 5, wherein said self-sealing valve comprises a spring-loaded valve member.

7. A coupling assembly according to claim 5, wherein said socket is provided with a resiliently-biased rock ring in an interior portion of said socket where said plug is received, wherein said plug is provided with at least one recess engageable with said rock ring, thereby engaging said socket and said plug.

* * * * *